United States Patent [19]

Gustavsson

[11] Patent Number: 5,625,340
[45] Date of Patent: Apr. 29, 1997

[54] DEVICE FOR SUPERVISING AN AREA

[76] Inventor: Kenneth Gustavsson, Murkelvägen 5, Åkersberga, Sweden, S-184 34

[21] Appl. No.: 256,833

[22] PCT Filed: Feb. 1, 1993

[86] PCT No.: PCT/SE93/00071

§ 371 Date: Jul. 28, 1994

§ 102(e) Date: Jul. 28, 1994

[87] PCT Pub. No.: WO93/15416

PCT Pub. Date: Aug. 5, 1993

[30] Foreign Application Priority Data

Jan. 31, 1992 [SE] Sweden .................. 9200265
Dec. 23, 1992 [SE] Sweden .................. 9203904

[51] Int. Cl.$^6$ ............................................. G08B 13/26
[52] U.S. Cl. ........................ 340/561; 340/565; 340/573
[58] Field of Search ................................ 340/565, 573, 340/541, 561; 238/12; 342/158, 126

[56] References Cited

U.S. PATENT DOCUMENTS

| 4,995,102 | 2/1991 | Ichinose et al. | 342/158 |
| 5,180,122 | 1/1993 | Christian | 340/583 |
| 5,386,285 | 1/1995 | Asayama | 340/903 |

FOREIGN PATENT DOCUMENTS

| 0188757 | 7/1986 | European Pat. Off. . |
| 2361106 | 6/1974 | Germany . |
| 2401043 | 7/1975 | Germany . |
| 2656706 | 6/1978 | Germany . |
| 6488899 | 4/1989 | Japan . |
| 1195172 | 8/1989 | Japan . |
| 1306365 | 12/1989 | Japan . |

*Primary Examiner*—Thomas Mullen
*Assistant Examiner*—Albert K. Wong
*Attorney, Agent, or Firm*—Browdy and Neimark

[57] ABSTRACT

A device for supervising an area (16), in particular the crossing area between railway gates, in order to detect objects occurring in the area comprises a detector (18) adapted to transmit detection signals and receive their reflection caused by objects. The detector (18) is pivotably arranged in a reciprocal manner so as to transmit the detection signals in an angular area. The detector (18) may be a laser, the light of which forms the detection signals.

8 Claims, 2 Drawing Sheets

DEVICE FOR SUPERVISING AN AREA

It can be established that today there are in practice no safe devices to supervise the crossing area, for instance the area between railway gates, at crossings between railways and roads so as to detect objects occurring in the crossing area, such as road vehicles and persons in order to avoid them being run into by trains.

Efficient devices for supervising are missing also in many other situations. It may then be the question of supervising of objects in the form of aeroplanes or other crafts or vehicles which are not bound to rails. Thus, the detection may have the purpose to supervise the movement of these objects within the area in question. The device according to the invention may then be adapted to provide control or simplify such control of the object in question to a determined position for e.g. docking or give alarm in respect of undesired deviations between the actual position and the one desired.

There is no device for supervising areas which may be dangerous to set foot on which combines a reasonable cost with great flexibility and range. When docking for instance aeroplanes to a gate the positioning is critical since a collision often costs millions. The lead beacon systems occurring today give very simple and insufficient information to the pilot.

OBJECT OF THE INVENTION

The object of the present invention is to provide a supervising device, with the assistance of which the deficiencies presented hereinabove may be reduced or eliminated.

SUMMARY OF THE INVENTION

The device according to the invention achieves the object of overcoming deficiencies of the prior art as noted above. It becomes possible, by means of the solution defined, to use a relatively uncomplicated, pivotably arranged detector, the efficient detection area of which is obtained by processing the detection signals from the detector so that delimited distance values in the pivoting angular area are the basis for the assessment of the detection so that one in practice obtains an efficient detection area corresponding to the area to be supervised, but not more. In other words one can accordingly, by design, adjustment or programming of the signal processing unit, achieve an accurate definition of the extent of the supervising area by causing the distance value concerning the detection range to vary in the pivoting angular area. For example, the supervising area may be caused to be substantially rectangular, which normally would be desirable when supervising crossings between railways and roads.

The device according to the invention involves great advantages since it can easily be adjusted to the most varying supervising conditions with the same hard ware. Furthermore, the device according to the invention involves the advantage that it, besides instantaneous determination of position also can sense speed and speed gradients. This is of considerable value for instance in application for supervising the docking area between aeroplanes and a gate. It is pointed out that the device in such a case does not require any adjustment of the aeroplane or the object whatever. Instead, information detected by the detector may be indicated on a display unit, which may be of the table type or viewing screen type so that the operator or pilot obtains needed information about the position of the aeroplane during docking by viewing the same. The signal processing unit may then be designed to indicate, on the display unit, an optimal position for the aeroplane at each given point of time.

The device according to the invention may without change be used for most installations within railway crossings, aeroplane dockings and area supervision with a hard and soft ware which is substantially identical.

Specific developments of the invention are defined more closely in the dependent claims.

BRIEF DESCRIPTION OF THE DRAWINGS

With reference to the enclosed drawings, a more specific description of embodiments of the invention cited as examples will follow hereinafter.

In the drawings.

DETAILED DESCRIPTION OF AN EMBODIMENT FOR RAILWAY CROSSINGS

Figure 1:
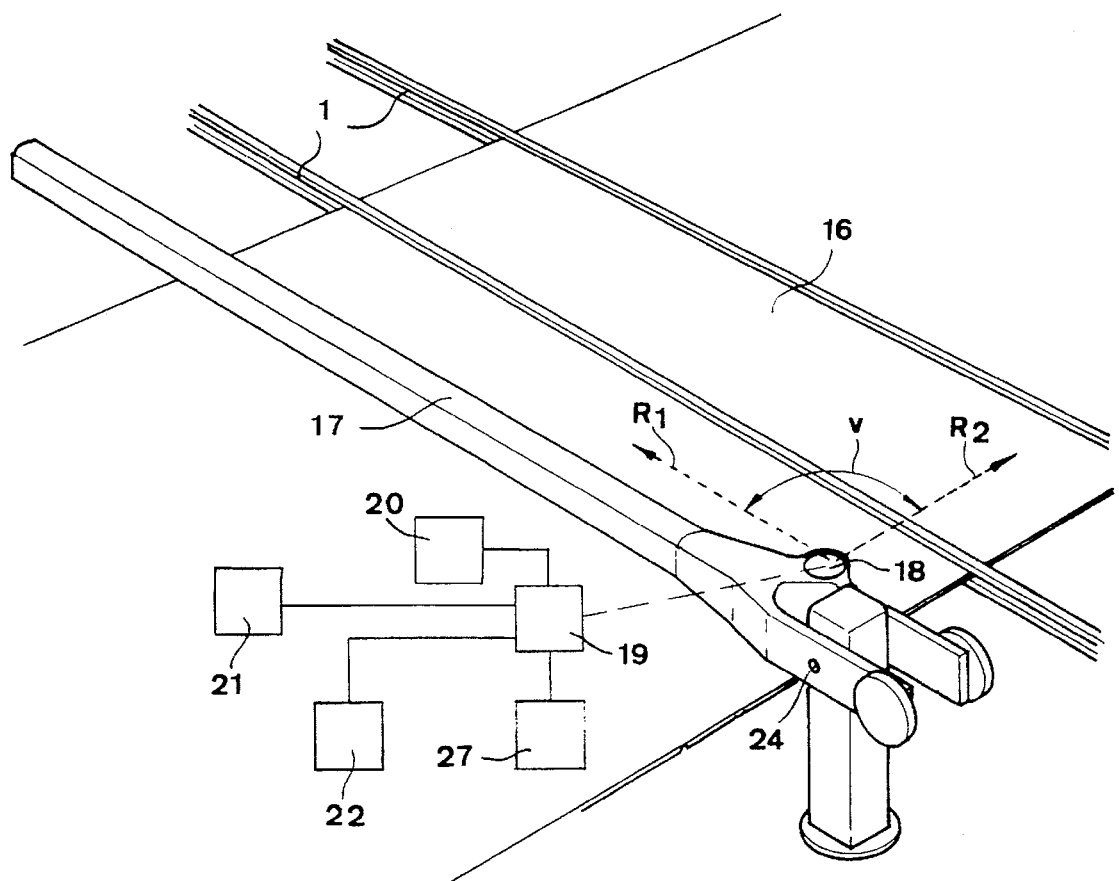
FIG. 1 is a perspective view illustrating a passage preventing gate at a crossing between a railway and another road, a block diagram also being included.

A crossing between a railway I and another road 2 is illustrated in FIG. 1. This latter road does not comprise any tracks as does the railway 1 but is intended to be traversed by vehicles provided with rubber wheels, i.e. the path of the road 2 is flat or plane.

The term "railway" includes ways and tracks for track bound vehicles such as trains, commuter trains, rail cars, trains for underground railways and so on.

Figure 2:
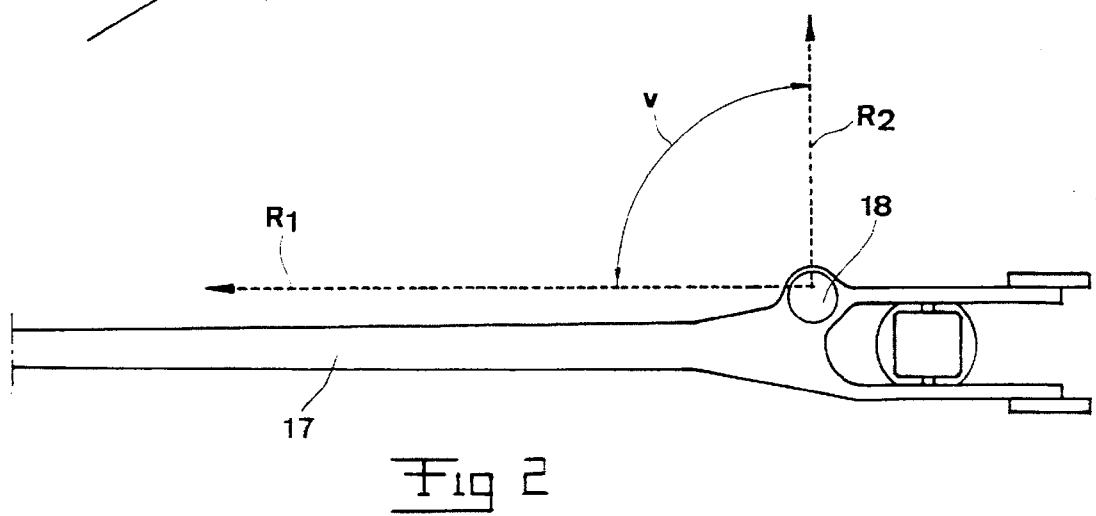
FIG. 2 is a view of the gate illustrated in FIG. 1 viewed from above.
Figure 3:
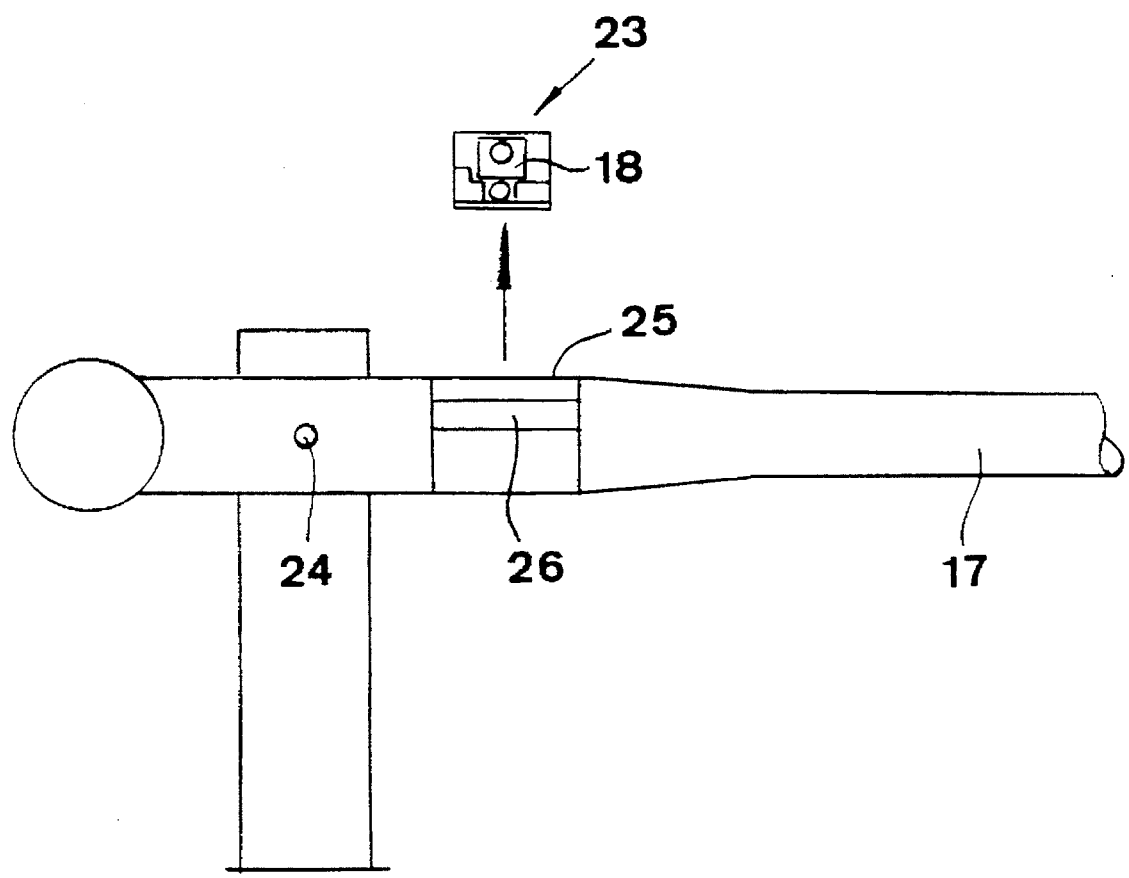
FIG. 3 is a detail view of the gate illustrated in FIG. 1 as viewed from the side adjacent to the railway tracks.

The device illustrated in FIGS. 1–3 is adapted to supervise the crossing area 16, e.g. the area between railway gates 17, at crossings between a railway 1 and another road 2 of the nature already described in order to detect objects which occur in the crossing area 16 and which form a hindrance to the train or the like moving on the railway 1.

A detector is diagrammatically indicated with 18 in FIGS. 1 and 2. This detector is adapted to transmit detection signals and to receive their reflection caused by objects. The detector is pivotably arranged reciprocally so as to transmit the detection signals in an angular area. This angular area is indicated with the angle v in FIGS. 1 and 2. More specifically, this angular area is delimited by a direction R1 extending substantially parallel to the gate 17 and a direction R2 extending substantially perpendicularly to the gate.

The detector 18 is in a manner diagrammatically indicated in FIG. 1 connected to a signal processing unit 19 adapted or adjustable/programmable to process signals obtained from the detector 18 in order to delimit the detection of foreign objects to a distance value varying in the pivoting angle area v in order to achieve an efficient detection area corresponding to the crossing area to be supervised. Crossing areas are in practice normally substantially rectangular. The efficient detection distance along the direction R1 may substantially correspond to the width of the road 2 or for instance one half thereof in case there is a further detector for the other road half, whereas the efficient detection distance along the direction R2 normally is the width of the crossing area 16 transversely to the railway 1.

In order to achieve the detection area aimed at, there is conducted in the signal processing unit 19 such a signal processing that the efficient detection distance will vary whereas the detector is pivoted between the directions R1 and R2 such that the supervising device only reacts if, within this efficient detection area, some object, for instance a vehicle or a person, would occur, which at that point of time should not rightly be there. Thus, this means that the control unit 19 is co-ordinated with the gate operating arrangement or otherwise receives information as to when trains are in a dangerous neighbourhood and activates the detection operation not until there is a real danger.

The signal processing unit 19 is adapted to, on detection of objects in the crossing area, a) control an operating arrangement 20 to raise the gate 17 and/or
b) control a signal arrangement 21 to indicate to an approaching train that objects are in the crossing area and/or
c) control an automatic train stop arrangement 22 to stop the approaching train.

Furthermore, it is preferred that the signal processing unit 19 is adapted or adjustable to react only to objects having an area exceeding a certain value. This area value should be adjusted not to exceed that which could be expected from a human being but such that reactions are not unnecessarily given to small animals.

Furthermore, it is preferred that the signal processing unit 19 is arranged or adjustable to give alarm or react only if an object has been detected a certain number of times in sequence or during a certain time period. This has the purpose to avoid reaction or alarm being given in case an object rapidly passes the supervising area.

A combination could then be provided in the sense that the signal processing unit 19 could be arranged or adjustable to react or give alarm only if the same size of an object has been detected at the same place a certain number of times in sequence or during a certain time period. The desired control operation or alarm, including for instance a signal directly to the approaching train, is then initiated.

Advantageously, the detector 18 comprises a laser, the light of which forms the detection signals.

As also appears from FIGS. 1 and 2, the detector may be arranged on the gate 17 itself for fencing off the crossing area 16.

FIG. 3 illustrates somewhat more in detail that the detector 18 may be arranged in a cassette 23, which in its turn is receivable in a compartment 25 arranged in the gate 17 in the area of the pivoted suspension 24 thereof. The detector 18 with its sweep motor and electronics is, accordingly, mounted within said cassette 23, which suitably may consist of a transparent plastics tube. This plastics tube is sealed in a moisture tight and dust tight manner at the top and at the bottom. The cassette 23 is mounted and secured in the compartment 25 and then the compartment is sealed with a closing cover. The electrical connections occur with particular moisture protected connectors with quick coupling. In a wall of the compartment 25 there is arranged a window 26, thorough which the detection signals of the detector pass.

The cassette 23 enables rapid exchange on repair and maintenance.

It has been described hereinabove that the detector 18 is arranged at the gate 17 itself. This is an advantageous design in the sense that there will not be needed any particular carrying devices for the detector and, furthermore, the movements of the gate 17 will have the consequence that the vibrations occurring will keep the signal exits of the detector free from hindering snow etc. However, it should be emphasized that the detector 18 could also be arranged at a carrier, for instance in the form of a post or the like secured relative to the ground, separate from the gate 17.

It is preferred that the signal processing unit 19 is also connected to a display device 27 to indicate the position of a detected object by means of said unit. The signal transmittance between the signal processing unit 19 and the display unit 27 may be wireless or may otherwise occur by means of long cables so that appropriate supervising personnel may study the display unit and follow the development of events. In case of a railway application, the display unit 27 could also be provided in a locomotive so that the driver could see whether any foreign objects would be present in the area supervised.

In the case according to the example, the detector 18 is intended to be pivotable or rotatable about a substantially vertical axis in order to cover the supervising area 16. In order to increase the detection width vertically during pivoting in the angular area v, the detector could be pivotable about a further axis, which is suitably substantially horizontal. The device could then be such, that the detector pivoted vertically in an oscillating movement whereas it moved in the angular area v.

DESCRIPTION OF ALTERNATIVE EMBODIMENTS

The device according to the invention is also suitable to be used for other detection purposes. It could for instance be the question of detection of the position of aeroplanes or other crafts within specific zones, for instance position determination of aeroplanes within docking zones at a gate, the purpose of the device according to the invention being to simplify guidance of the aeroplane or the object into the desired end position. The device according to the invention then operates so as to be capable of detecting also other objects located at the wrong place and stop the docking or the like in case of risk for collision.

The device according to the invention may, besides, by suitable design of the signal processing unit 19 be made to sense, itself, normal situations by "remembering" the surroundings and thereby only give alarm at specified deviations. This involves a great flexibility in the installation and a possibility to see small objects in complex environments.

The features and designs described hereunder are in certain cases specifically useful for other applications but may, on the other hand, be possible in certain cases to apply in connection with the device already described for supervising the crossing area between railways and other roads. In the following other applications will be described while using, as far as possible, the same designations used in FIGS. 1–3. Thus, the difference is that the area 16 which is to be supervised in the situations discussed hereunder is thought to be other areas than railway crossings.

It is preferred that the signal processing unit 19 is adapted to store information obtained from the detector 18 about stationary objects located in the area and distinguish information thereabout from information concerning objects movable in the area. The processing unit 19 is then preferably adapted to give alarm and/or indication only in connection with movable objects in the area 16.

As already mentioned, a display unit 27, suitably of the table type or viewing screen type, is preferably connected to the signal processing unit 19. The latter is then adapted to indicate, by means of the display unit, the position of detected objects with respect to angle and distance and suitably compare this position with the desired position of the object, differences between the positions being useful for control values for directing the object to the desired position.

As has already been pointed out, the device may be adapted for detection of objects in the form of aeroplanes or other crafts or vehicles which are to be stopped in a desired or known position and have the possibility to follow a certain path or course.

The signal processing unit 19 is adapted to show, on the display unit 27, information about the lateral position of the object and/or distance and/or velocity relative to a known point and, possibly, to start an alarm when there are excessive deviations relative to desired values.

The detector 18 and signal processing unit 19 may be arranged to measure the distance to one or more objects and to use the reflection indicative of the most remote object if there are more in the light lobe, and to consider adjacent reflections as disturbances and eliminate the same electronically.

The signal processing unit 19 is preferably arranged to calculate the area and/or shape of the object and use the information thereabout to treat different objects differently as a consequence of size and/or shape and to disregard, as far as signal processing is concerned, those which fall outside certain programmed sizes and/or shapes.

The detector 18 is suitably arranged to search for the part of the detected object which is the closest and then follow that part and use it as a control point. The signal processing unit 19 and the detector 18 are arranged to sense, at the same time, undesired objects on the wrong place and present information thereabout by means of the display unit 27, the unit 19 being capable of alarm so as to, for example, interrupt a docking of an aeroplane or other vehicle when there is a risk for problems.

The designs described may of course be modified in several ways within the scope of the inventive concept.

I claim:

1. A device for supervising a crossing (16) by detecting an object in a predetermined effective detection area of the crossing lying between railway gates of a railway and another way, the device comprising:

a detector (18) including means for transmitting a detection signal beam and receiving beam reflections from the object;

reciprocating means for pivotally reciprocating the detector to transmit the detection signal beam over a pivot angle (v);

a signal processing unit (19) coupled to the detector, the signal processing unit including means for delimiting the effective detection area by determining an effective distance as a function of the pivot angle and considering only objects within the effective distance; wherein:

the crossing area (16) is substantially rectangular; and the angle (v) is bounded by a first direction (R1) extending substantially parallel to one of the railway gates, and a second direction (R2) extending substantially perpendicularly to the one of the railway gates.

2. The device according to claim 1, wherein:

the device comprises at least one railway gate (17) for closing off the crossing area; and the signal processing unit (19) includes means for controlling a gate operating arrangement (20) to raise the railway gate upon detection of the object in the effective detection area.

3. The device according to claim 1, wherein:

the device comprises at least one railway gate (17) for closing off the crossing area; and the detector (18) is disposed on the railway gate.

4. The device according to claim 1, wherein the signal processing unit (19) includes means for controlling a signal arrangement (21) to indicate to an approaching train presence of the object in the effective detection area.

5. The device according to claim 1, wherein the signal processing unit (19) includes means for controlling an automatic train stop arrangement (22) to stop approaching trains upon detection of the object in the effective detection area.

6. The device according to claim 1, wherein the means for transmitting a detection signal beam comprises a laser.

7. The device according to claim 5, wherein:

the device comprises at least one railway gate (17) for closing off the crossing area; and the railway gate comprises a compartment (25) provided in the gate adjacent a pivotable suspension (24) of the gate, and means for receiving the detector (18) in said compartment.

8. The device according to claim 1, wherein the signal processing unit (19) is adjustable to react only to objects which have an area exceeding a certain value.

* * * * *